United States Patent [19]
Langley

[11] Patent Number: 6,162,855
[45] Date of Patent: Dec. 19, 2000

[54] BAUXITE FILLER FOR CARPET BACKINGS

[75] Inventor: Darryl A. Langley, Benton, Ark.

[73] Assignee: Reynolds Metals Company, Richmond, Va.

[21] Appl. No.: 09/408,610

[22] Filed: Sep. 30, 1999

Related U.S. Application Data

[60] Provisional application No. 60/120,750, Feb. 18, 1999.

[51] Int. Cl.$^7$ .............................. C08K 3/10; C08K 3/22; C08J 9/30
[52] U.S. Cl. .............................. 524/437; 521/65; 521/71; 521/92; 521/123; 521/907; 524/914
[58] Field of Search .................................. 521/65, 71, 92, 521/123, 907; 524/437, 914

[56] References Cited

U.S. PATENT DOCUMENTS

| | | | |
|---|---|---|---|
| Re. 34,951 | 5/1995 | Slosberg et al. | 428/95 |
| 3,663,345 | 5/1972 | Jaisinghani | 161/64 |
| 3,928,281 | 12/1975 | Uchigaki et al. | 524/425 |
| 4,012,547 | 3/1977 | Smedberg | 428/97 |
| 4,062,693 | 12/1977 | Berger | 106/481 |
| 4,182,799 | 1/1980 | Rodish | 521/98 |
| 4,216,130 | 8/1980 | Rigge et al. | 524/437 |
| 4,239,563 | 12/1980 | Iacoviello | 156/72 |
| 4,397,978 | 8/1983 | McKinney et al. | 524/409 |
| 4,622,070 | 11/1986 | Sakurai et al. | 106/38.22 |
| 4,781,982 | 11/1988 | Musselman et al. | 428/403 |
| 5,535,890 | 7/1996 | Behl et al. | 209/5 |

OTHER PUBLICATIONS

The British Aluminum Company Limited—SG/1660/JS—Apr., 1979—New Possibilities for Reducing the Flammability of Plastics.

F.K. Antia, et al.—The Combined Action of Aluminum Oxides and Halogen Compounds as Flame Retardants—European Polymer Journal, vol. 17, pp. 451 to 455, 1981.

D.F. Lawson, et al.—Mechanism of Smoke Inhibition by Hydrated Fillers—Rubber Chemistry and Technology—vol. 48, pp. 124–139.

J.Z. Keating—Alumina trihydrate: Flame–retarding smoke–suppresing filler—C/Plastics Compounding, Jul./Aug. 1980, pp. 23–35.

T. Dickson—Flame retardants—legislation needed to fire markets—Industrial Minerals, 1983, pp. 89–94.

Fire–Retardent Agent Made—Americal Metal Market, Mar. 8, 1972, p. 9.

Flame Retardants: R&D Pace Quickens, Plastic Technology, Jul. 1976.

Smoke . . . what's being done about it, Modern Plastics, Mar. 1983, pp. 54–57.

*Primary Examiner*—Peter A. Szekely
*Attorney, Agent, or Firm*—Alan M. Biddison

[57] ABSTRACT

Naturally occurring bauxites are suitable as flame retardants and can be incorporated into polymeric carpet backings, when they are ground or pulverized to obtain a generally uniform distribution of particles predominantly less than 250 micrometers in size and containing up to 45 wt. % of fines (less than 3 micrometers in size), and then used in combination with an appropriate wetting agent, dispersant, froth aid, latex, and thickener package to wet-out and disperse the particles and provide adequate control of viscosity build. The bauxite should preferably have a high gibbsite content and should preferably have a pH range of from 4.5 to 8. Mechanical stirring can be used to aid in viscosity control. Lowering the specified percent solids in a formulation by adding small amounts of water allows for even finer ground bauxite (up to 55 wt. % of fines) to be used as filler for carpet backings.

11 Claims, No Drawings

BAUXITE FILLER FOR CARPET BACKINGS

This application claims the benefit of U.S. Provisional application Ser. No. 60/120,750 filed Feb. 18, 1999.

FIELD OF THE INVENTION

This invention relates to flame retardant fillers for carpet backings. More specifically, this invention relates to the use of bauxite as a flame retardant for polymer compositions such as those used in carpet backings.

BACKGROUND

Extensive efforts have been made to provide flame retardant carpets for both residential and commercial buildings. A material currently used to provide flame retardancy in such materials is alumina trihydrate ($Al_2O$, $3H_2O$), also known as hydrated alumina or ATH. Alumina trihydrate provides excellent flame retarding properties and is also non-toxic.

The alumina trihydrates used for this purpose are usually obtained by the extensive refining of natural bauxite. They are characterized by high purity and are substantially uniform in chemical characteristics. Obviously, this high degree of purity adds to the cost of the ATH product.

Heretofore, bauxite, a source of the refined alumina trihydrate, has not been found suitable as a flame retarding agent for such applications. The problem is that bauxites do not have uniform chemical and physical characteristics, and their appearance and composition will vary from geographical location to geographical location and may even differ from mining site to mining site within one location. A further problem is that grinding bauxite for use in filler applications typically produces considerably more fines than grinding ATH and these excessive fines can cause viscosity and processing problems. Nevertheless, interest continues in seeking ways to utilize bauxites as flame retardant fillers.

U.S. Pat. No. 4,216,130 of Rigge et al., issued Aug. 5, 1983, teaches that bauxite can be rendered compatible with carpet backing polymer compositions if it is processed so as to have an alumina ($Al_2O_3$) content of from about 40% to about 60% by weight wherein the $Al_2O_3$ is in hydrated form, with the balance being $Fe_2O_3$, $TiO_2$ and $SiO_2$ and other impurities, and the bauxite must be ground so as to have a surface area of less than 12 $m^2/g$ when dried for one hour at 100° C., have a pH of at least 6.5 measured at 20° C. in an aqueous suspension containing 5 grams of ground bauxite/100 grams of water, and a particle size distribution wherein the particles of less than about 3 microns in size constitute less than about 15% by weight of the ground bauxite.

However, these property ranges are rather restrictive and accordingly there still remains a need to provide a formulation package and bauxite particle size specification to cover a wider range by which bauxites may be used as flame retardant fillers in polymer compositions used in carpet backings.

SUMMARY OF THE INVENTION

It is accordingly an object of the present invention to provide an improved method for using bauxite as a flame retardant filler for foamed latex carpet backings, carboxylated latex precoats, adhesives, and similar applications, and products resulting from this improved method.

The invention relates to the use of untreated, ground bauxite, either as the sole filler or in combination with a mixture of known fillers such as ATH and calcium carbonate, which in combination with inorganic wetting agents such as TKPP, chelating agents, organic (low molecular weight, short C—H chain polyacrylate) dispersants, latex and froth aids (lauryl sulfate free and sulfosuccinimate free) aid carpet backing formulations to provide acceptable long term (24 hours or longer) stability of the carpet backing slurry. If the compounded carpet backing formulation has to be held in holding tanks for one or more days the slurry viscosity must remain fluid enough for pumping back to the application tanks. Carpet backing formulations with specifications for initial viscosity in the 12,000 centipoise range would be expected to not exceed 20,000 centipoise and carpet backing formulations with specs for initial viscosity in the 15,000 to 18,000 range would be expected to not exceed viscosity build to somewhere in the 25,000 to 30,000 centipoise range. Even though some viscosity build may occur, the suspensions have good rheological properties and appear to be thixotropic (they can be stirred back to near their original viscosity fairly easily) rather than the detrimental dilatant character.

The invention is believed to be an improvement over previous teachings/patents on the use of fine ground bauxite in the above applications and addresses the practical issues of using bauxite commercially. The various issues preventing the use of bauxite as a filler for these applications have been evaluated and practical solutions are provided. For the bauxite, problems with particle size and pH are addressed. For the slurry formulation for carpet backing, problems with filler dispersion, aging (viscosity build with time), and agitation are addressed.

As an improvement over previous practice, the present invention provides for the use of finer, ground bauxite (up to 45% or more particles less than 3 micrometers) to make fluid, well dispersed and stable latex systems.

An additional improvement over previous practice is the use of bauxites with pH as low as 4.5 (preferably in the 5 to 8 pH range) as compared with the lower pH limit of 6.5 in previous practice to make fluid, well dispersed and stable latex systems.

If additional viscosity control is needed, the invention also describes blunging or mixing (continuous or intermittent) of the slurry to maintain good fluidity and stable viscosity of the ground bauxite filled latex carpet backing formulation for 24 hours or longer, which has practical significance.

Other objectives and advantages of the present invention will become apparent as the description thereof proceeds.

DESCRIPTION OF THE INVENTION

The present invention is directed to the utilization of naturally occurring bauxites as flame retardants, and more specifically to their incorporation into polymer backings for use in the carpet industry.

Bauxite refers generally to the naturally occurring aluminous ore which contains alumina, usually expressed as $Al_2O_3$, as a major constituent with the balance comprising iron oxide, titanium dioxide, silicon dioxide and a minor amount of other impurities. Bauxites occur throughout the world and the composition thereof varies from one location to another. Most bauxite ore comes from open-pit mines with the largest deposits being found in Jamaica, Australia, Surinam, Eastern Europe and Guyana. While the composition of the ore varies, alumina is always present as the main ingredient, normally as alpha-alumina trihydrate, also known as gibbsite, together with smaller amounts of other minerals. Alumina trihydrate (ATH) is usually extracted from the bauxite by the well known Bayer process. Alumina may also be present in bauxite as boehmite and diaspore (alumina monohydrates) which are more difficult to extract.

Size reduced Guyana bauxite is especially suited for use in the present invention due to its high alumina trihydrate content (70 to 90% gibbsite, but typically 80 to 85%) and low impurity level. Such bauxite is typically mildly acidic and does not readily wet-out and blend in a polymer solution (such as a latex), the type normally used with ATH as a filler to form a homogeneous slurry without excessive mechanical stirring and even then tends to form undesirable lumps. Of equal concern is the fact that the bauxite filled latex slurry tends to build (increase) in viscosity if held for extended periods and becomes very difficult to pump from holding vessels.

According to this invention, it has been discovered that if proper additives are used with a latex that has been properly selected or adjusted to accommodate bauxite, and the bauxite is pulverized to an appropriate particle size distribution, the bauxite will wet-out much easier with less agitation required for processing to a form well-suited for use as a flame retardant filler. Use of the proper latex and additives also reduces the viscosity build to a manageable level.

As with other fillers, it has also been discovered that the bauxite filler is improved if appropriately ground prior to blending with the latex. Preferably, the bauxite is ground in a conventional manner to obtain a substantially consistent mixture. Grinding is important to break down chunks or large pieces of the bauxite so as to obtain a more uniform distribution of particles and eliminate larger particles which will cause problems as they have more of a tendency to separate from the latex during foaming and application to carpet backing. The ground bauxite should be predominantly less than 250 micrometers in size and may have fines in amounts of up to 45 wt. % which are less than 3 micrometers. It has also been noted that bauxite with even greater fines content (up to 55 wt. % less than 3 micrometers) can be used if the percent solids of the carpet backing formulation is reduced by only 1% (for example reducing the solids content of a formulation using bauxite as the filler from 80 to 79%, by increasing the water addition, allowed a bauxite sample with 54.7% fines to be used successfully. This means that if the bauxite is properly ground, the fines need not be removed for it to perform well as a flame retarding filler.

It is known from U.S. Pat. No. 4,216,130 mentioned above that bauxites in their "as mined" condition contain a particle mixture which ranges in particle size from micron (micrometer) size to pebble or even rock size. As pointed out in U.S. Pat. No. 4,216,130, it is necessary that the bauxites be ground to obtain a fairly uniform particle size distribution. However, when bauxites are ground in conventional grinding equipment, while they are readily reduced in size, because of the nature of the ore, the grinding process generates a large percentage of fines, usually defined as less than 3 micrometers in size. The percentage of fines in this invention may be in excess of the 15 wt. % maximum specified in U.S. Pat. No. 4,216,130, and may range from about 20 up to 45 wt. % (preferably up to 40%) of the total weight of the ground bauxites. As already stated, if the percent solids of the carpet backing formulation can be lowered slightly, the amount of fines in the bauxite can go as high as 55% or more. According to U.S. Pat. No. 4,216,130, bauxites which contain these high amounts of fines cannot be used in pre-coat and adhesive applications because of the viscosity increase imparted to the polymers used for this purpose by the excess fines. Therefore, U.S. Pat. No. 4,216,130, points out that the percentage of fines in the ground bauxite should not exceed about 15% by weight. U.S. Pat. No. 4,216,130 also specifies that the bauxite must be at least 6.5 pH or greater when measured at 20° C. in an aqueous suspension containing 5 grams of ground bauxite/ 100 grams of water.

In contrast to the teachings of this prior art patent, it has been discovered with the present invention, that the bauxites employed herein can be ground in conventional grinding equipment and used as a flame retardant filler in polymers employed in carpet backings even if the bauxite contains an amount of fines in excess of 15% by weight and the bauxite pH is as low as 4.5. Therefore, a preferred bauxite material of the present invention comprises bauxite which has a pH greater than 4.5, and preferably greater than 5, and which has been ground so that it comprises a substantially uniform particle size distribution which is predominantly less than 250 micrometers and may contain up to about 45% by weight (or even greater if the percent solids of the formulation is lowered slightly) of fines, defined as particles having an average diameter of about 3 micrometers or less.

The bauxite prepared in accordance with this invention is useful as a filler and flame retardant in various polymer systems such as polyesters, latex foams and adhesives, acrylics, epoxies, polyurethanes, ethylene and propylene copolymers, and thermoplastics such as polyvinylchloride, polyolefins, and polystyrene. In a preferred embodiment according to this invention, however, the bauxite is especially suitable as a flame retardant filler for use in aqueous systems with latex foam rubber and carboxylated latex adhesives used in carpet backings.

In order to obtain the best results, the latex must be adjusted to accommodate the differences between bauxite and ATH. The preferred latex is a modified styrene-butadiene polymer. The bauxite is used in the conventional manner in place of the more expensive alumina trihydrate currently used as a flame retardant filler in such systems. A typical carpet backing latex system formulation will contain a SBR or natural rubber latex, flame retardant and or other fillers, and various other additives. The filler used in such systems is typically present in an amount of about 30 to 80 wt. % preferably 60 to 70 wt. % (but may be lower) of the total mix and bauxite may be substituted on a weight basis for the ATH portion in any conventional formulation, together with the selected proper latex, dispersant/wetting agent package, and froth aid.

When incorporating the bauxite flame retardant material into the polymer composition, it is helpful to incorporate an effective amount of a dispersant into the mixture to properly disperse the bauxite into the polymer composition. The dispersant should be present in an amount of about 0.01 to 4.0 wt. %. Any operative dispersant may be used although organic short chain polyacrylate dispersants and chelating agents are preferred. The short chain polyacrylates (e.g., Geosperse brand) give a much greater reduction in viscosity of the filler/latex slurry than the standard long chain polyacrylate dispersants at comparable charges. Inorganic wetting agents (such as inorganic phosphates) may also be considered dispersants and can be helpful in wetting out the bauxite for better dispersion. A properly selected combination of dispersants gives added viscosity stability to the bauxite filled latex.

Some froth aids also tend to increase the viscosity build in bauxite/latex systems especially the lauryl sulfate and sulfosuccinate froth aids. For best performance, lauryl sulfate and/or sulfosuccinate compounds should not be in the froth aids or latex used with bauxite filler.

It has been discovered according to the invention however that froth aids which are not of the lauryl sulfate and sulfosuccinate family are most effective in the compositions of the invention while still minimizing viscosity build-up in the bauxite/latex systems. Such froth aids preferably are anionic surfactants and do not contain lauryl sulfate or sulfosuccinaite compounds. Such froth aids are available from Chem-Tex Laboratories.

It is important that the additives for bauxite-filled carpet backing formulations be selective to prevent excessive viscosity buildup. It is highly preferred according to the invention that the viscosity build should be no greater than about 75% and should preferably be no greater than about 50%. Agitation of the slurry should return it to near the initial viscosity.

In a preferred formulation, the present invention would provide an aqueous latex system containing about 15 to 35 wt. % of latex, and about 30 to 70 wt. % of bauxite filler/flame retardant having the characteristics recited above. In addition, the preferred formulation would contain about 0.01 to about 2 wt. % of dispersant, about 0.01 to 2 wt. % of wetting agent, about 0.01 to about 2.0 wt. % of a froth aid and/or surfactant, and about 0.01 to about 5.0 wt. % of thickener.

If it becomes necessary to hold the compounded, carpet backing formulation in holding tanks, use of the above combination of proper latex, dispersant(s), and froth aid(s) should prevent excessive viscosity build which could cause problems with pumping the slurry back to the application tanks. However, if there is concern that the viscosity build may cause problems, especially with the formulations requiring higher initial viscosities (over 15,000 centipoise), mechanical stirring (continuous or intermittent) may prevent or slow the viscosity build until the slurry can be used. Even if the slurry is left unstirred while holding, if mechanical stirring can be used before pumping, the slurry typically stirs back to near its original viscosity.

The following examples are presented to illustrate the invention but it is not to be considered as limited thereto.

EXAMPLE 1

In this example, a carpet backing formulation, involving filler combinations, is used to test the use of bauxite combined with other fillers in latex carpet backing. Calcium carbonate (whiting) is one of the most widely used fillers, either alone or in combination with other fillers such as ATH.

In the current formulation, ATH and whiting compose approximately 64.6% of the formulation (ATH to whiting ratio of 2.5 to 1.5), with latex being the other major component. Water, froth aids, and thickener make up the remainder.

Table 1 below gives results of tests using ground bauxite to replace the ATH in the formulation. Bauxite for this example was pulverized in a roller mill to give a ground material with an average particle diameter of approximately 10.4 micrometers, with 0.5 to 2.5% greater than 250 micrometers and approximately 39% fines (smaller than 3 micrometers). These particle size measurements were made with a Horiba LA-910 Laser Particle Size Analyzer. The pH of the bauxite measured 5.2 in a 20% suspension of bauxite in water at 22° C. The filler must wet-out and disperse well in the latex and water. After stirring in the froth aid and thickener, the formulation must achieve an accepted viscosity of 11,000 to 12,000 centipoise. The build in viscosity over several days (usually 1 to 5 days) must be limited to allow for the mixture to be pumped from storage tanks to feed tanks or directly to the froth heads for application as the carpet backing. Frothing the mixture and performing spinout tests should show that the filler has little tendency to separate from the latex. The following table (Table 1) compares results of substituting bauxite for ATH in the carpet backing formulation with subsequent changes in latex, dispersants, and froth aids.

TABLE 1

250 ATH + 150 Whiting Precoat

| Filler (whiting plus) | Latex LID | Dispersant Type | Froth Aid - Lauryl Sulfate Type Yes/No | Thickener Amount Required grams | Initial Viscosity cps | 24 Hour Viscosity cps | (% incr) |
|---|---|---|---|---|---|---|---|
| ATH | X03 | none | Yes | 2.47 | 12800 | 16750 | (31) |
| Bauxite | X03 | none | Yes | none | 26500 | >50000 | (>89) |
| Bauxite | X03 | SC Poly A | Yes | 0.55 | 12100 | 33500 | (177) |
| Bauxite | X05-1 | SC Poly A | Yes | 0.27 | 11400 | 40250 | (253) |
| Bauxite | X05-3 | SC Poly A | Yes | 0.20 | 11440 | 25750 | (125) |
| Bauxite | X05-3 | Comb Pkg | No | 0.11 | 11000 | 23500 | (114) |
| Bauxite | X08-1 | Comb Pkg | No | 0.10 | 11400 | 16500 | (45) |

SC Poly A = short chain (c-H) polyacrylate
Comb Pkg = combination package of dispersants (including a short chain polyacrylate Latex samples for these tests were provided by Reichhold, short chain polyacrylate dispersants by GEO, lauryl sulfate froth aids and thickener by ParaChem, and combination package dispersants and non-lauryl sulfate froth aids by Chem-Tex.

In this example, when ground bauxite is substituted for ATH, it does not wet-out or disperse well and gives a very high viscosity that renders it unfit as a filler. Adding a short-chain polyacrylate dispersant, such as Geosperse 44, improves the wet-out slightly, and once the bauxite is wetted, it disperses much better with a fairly good initial viscosity. However, the viscosity increases to a level higher than desired in 24 hours.

The latex used in this example are modifications of a styrene-butadiene polymer. The first attempt to change the latex to a more compatible one gave even higher viscosity build in 24 hours. When this latex was adjusted using trade secret additives, the viscosity build improved somewhat, and changing the dispersant to a combination package including a short chain polyacrylate and trade secret dispersants, and changing to an anionic surfactant froth aid which does not contain lauryl sulfate improved the viscosity build even more. Finally when the latex was modified to the X08 version with trade secret changes and used with the combination dispersant package and non-lauryl sulfate froth aid, the viscosity build was in the same range as with the ATH. Once the bauxite is dispersed well, it froths well and gives spinout results as good, if not better, than those obtained with ATH.

EXAMPLE 2

This example is concerned with incorporation of bauxites as flame retardants into carpet backings. In this example, a commercial carpet backing formulation is used to test the use of bauxite as a filler in a latex carpet backing. This formulation is a urethane precoat which conventionally uses ATH (alumina trihydrate) as the filler. In this instance the ATH comprises approximately 66.7% by weight of the wet backing, with the remainder composed mainly of latex and water with small amounts of wetting agent, dispersant, froth aids, and thickener. The filler must wet-out and disperse well in the latex mix (latex, water, wetting agent, and dispersant). After stirring in froth aids and thickener, the formulation must achieve an accepted viscosity of 12,000 to 13,000 centipoise. The build in viscosity must be limited and allow for the mixture to be pumped from holding vessels to feed tanks. Frothing the mixture and performing spinout tests should show that the filler has little tendency to separate from the latex.

The bauxite was prepared as in Example 1. The bauxite was pulverized in a roller mill to give an average particle diameter of approximately 10.4 micrometers, with 0.5 to 2.5% greater than 250 micrometers and approximately 39% fines (smaller than 3 micrometers). These particle size measurements were made with a Horiba LA-910 Laser Particle Size Analyzer. The pH of the bauxite measured 5.2 in a 20% suspension of bauxite in water at 22° C.

The following table (Table 2) compares results of substituting bauxite for ATH in the carpet backing formulation with subsequent changes in latex, dispersants, and froth aids.

Latex samples for these tests were provided by Reichhold, short chain polyacrylate dispersants by GEO, lauryl sulfate and sulfosuccinimate froth aids and thickener by ParaChem, and combination package dispersants and non-lauryl sulfate froth aids by Chem-Tex.

In this example, ATH wets out and disperses well and shows very little build in viscosity over 24 hours with varying latex (modified styrene butadiene polymers) and dispersants. When ground bauxite is substituted for ATH, it does not wet-out or disperse well and induces a very high viscosity that makes it unfit for filler. Substituting a short-chain polyacrylate dispersant for the long-chain polyacrylate type, normally used, only improves the wet-out slightly. However, once the bauxite is wetted, it disperses much better and gives very little filler separation during spinout. Nevertheless, the viscosity build in 24 hours is much greater than desired. When the latest dispersant package (contains a short chain polyacrylate and other trade secret additives) and an anionic surfactant froth aid (not containing lauryl sulfates or sulfosuccinates) are used, the viscosity build drops to a more reasonable range. When the properly selected latex (08) is used with this dispersant end froth aid package, the viscosity build is reduced to a manageable level.

EXAMPLE 3

This example teaches the use of mechanical stirring to slow viscosity build in bauxite-filled, compounded latex slurries to be used in carpet backings. In this example, the same commercial carpet backing formulation as that in example 2 is used to test the use of bauxite as a filler in a latex carpet backing. In this example a short chain polyacrylate dispersant is used but the adjusted latex is not used. Lauryl sulfate and sulfosuccinimate containing froth aids are used so viscosity build is expected with bauxite as a filler. After stirring in froth aids and thickener, the formulation must achieve an accepted, initial viscosity of 12,000 to 13,000 centipoise. The build in viscosity must be limited and allow for the mixture to be pumped from holding vessels to feed tanks.

The bauxite was roller mill pulverized as in Example 1.

The following table (Table 3) compares viscosity build between quiescent (unstirred), continuously stirred, and intermittently stirred, compounded, bauxite-filled latex slurry for carpet backing.

TABLE 2

ATH URETHANE PRECOAT

| Filler Type | Latex Type ID | Dispersant Type | Froth Aid Type First | Froth Aid Type Second | Thickener Added grams | Initial Viscosity cps | 24 Hour viscosity cps | (% incr.) |
|---|---|---|---|---|---|---|---|---|
| ATH | 63 | LC Poly A | Lauryl Sul | Sulfosucc | 4.50 | 11680 | 16300 | (40) |
| ATH | 63-2 | LC Poly A | Lauryl Sul | Sulfosucc | 4.54 | 12600 | 12500 | (−0.8) |
| ATH | 05-1 | SC Poly A | Lauryl Sul | Sulfosucc | 5.00 | 12200 | 13500 | (11) |
| Bauxite | 63 | LC Poly A | Lauryl Sul | Sulfosucc | none | >20000 | — | |
| Bauxite | 63-2 | SC Poly A | Lauryl Sul | Sulfosucc | 4.06 | 11600 | 37250 | (221) |
| Bauxite | 03 | SC Poly A | Lauryl Sul | Sulfosucc | 3.29 | 13000 | 32500 | (150) |
| Bauxite | 05-1 | SC Poly A | Lauryl Sul | Sulfosucc | 5.37 | 12200 | 42000 | (244) |
| Bauxite | 05-2 | SC Poly A | Lauryl Sul | Sulfosucc | 3.66 | 12400 | 35000 | (182) |
| Bauxite | 05-4 | Comb Pkg | Non Lr Sul | none | 0.62 | 12500 | 26750 | (114) |
| Bauxite | 08-2 | Comb Pkg | Non Lr Sul | none | 0.31 | 12100 | 16250 | (34) |

LC Poly A = long chain (C-H) polyacrylate
SC Poly A = short chain (C-H) polyacrylate
Lauryl Sul = lauryl sulfate
Non Lr Sul = non lauryl sulfate
Sulfosucc = sulfosuccinimate

TABLE 3

ATH URETHANE PRECOAT

No Agitation

| Time (hrs) | 0 | 24 | 96 |
|---|---|---|---|
| Visc (cps) | 12200 | 21750 | 25500 |
| Solids (%) | 78.2 | 78.2 | 8.2 |
| Temp (° C.) | 24 | 24 | 24 |

Continuous Stirring

| Time (hrs) | 0 | 2 | 6 | 29 | 52 | 72 |
|---|---|---|---|---|---|---|
| Visc (cps) | 12300 | 13100 | 14500 | 19800 | 27500 | 38500 |
| Solids (%) | 78.2 | | | 80.5 | 81.8 | 83.4 |
| Temp (° C.) | 25 | | 38 | 39 | 41 | 41 |

Intermittent Stirring

(2 minutes continuous, 28 minutes none, repeat -)

| Time (hrs) | 0 | 2 | 6 | 24 | 53 | 78 | 100 |
|---|---|---|---|---|---|---|---|
| Visc (cps) | 12600 | 13000 | 16400 | 16800 | 18200 | 19000 | 19800 |
| Solids (%) | 78.2 | | | 8.6 | | | 79.3 |
| Temp (° C.) | 25 | 24 | 23 | 24 | 24 | 24 | 24 |

This example shows that with no agitation the compounded formulation increases from 12,200 centipoise initially to 21,750 in 24 hours and on to 25,500 centipoise in 96 hours. If the slurry is continuously stirred (mechanical impeller), the viscosity is maintained below 20,000 centipoise for almost 30 hours, but increases to 27,500 centipoise in 52 hours and on to 38,500 centipoise in 72 hours. This increase, however, is believed to be partially due to the increase in slurry temperature with stirring and resultant evaporation of water and an increase in percent solids. If the slurry is stirred intermittently (2 minutes stirring, 28 minutes no stirring, then repeat) the temperature remains steady at 24° C. and the viscosity is less than 20,000 centipoise for at least 100 hours.

From these examples, it was concluded that bauxite can be used to replace ATH in carpet backing polymer formulations. The bauxite must be adequately pulverized and it may contain considerably more fines than previous literature/patents claim. The bauxite may also be of lower pH than previously claimed. For best results it is also preferred to select a latex which does not contribute to the viscosity build that may occur if the normal latex used with ATH is used with the bauxite. Use of wetting agents, chelating agents, and short chain polyacrylate dispersants and blends of such wetting agents and dispersants are advantageous along with anionic surfactant froth aids which do not contain lauryl sulfates or sulfosuccinimates. This combination of latex and additives allow the bauxite to be adequately dispersed in the formulation and keep the viscosity build at a manageable level. If the viscosity build with a particular formulation exceeds the desired level, mechanical stirring of the mixture should reduce the viscosity and intermittent stirring will maintain a lower viscosity for several days.

The invention has been described herein with reference to a limited number of embodiments/examples, however, as obvious variations thereon will be apparent to those skilled in the art, the invention is not to be considered as limited thereto.

What is claimed is:

1. A method for processing bauxite to form a flame retarding filler in polymeric formulations employed as backings for carpets, the steps of the method comprising: grinding the bauxite sufficiently to obtain a substantially uniform distribution of particles therein, said bauxite comprising particle sizes predominantly less than 250 micrometers in particle size to prevent separation from the polymer in frothing and application to the carpet backing, said bauxite comprising 20% by weight up to about 55% by weight of particles of less than 3 micrometers in size based on the total weight of the bauxite, and mixing the bauxite particles with a polymer selected from the group consisting of polyester, latexes, acrylics, epoxies, polyurethanes ethylene and propylene copolymers, polyvinyl chlorides, polyolefins, and polystyrene, an optional wetting agent (s), a dispersant(s), a non-lauryl sulfate and/or non-sulfosuccinate froth aid(s), and thickener in an aqueous formulation.

2. A method according to claim 1, wherein the bauxite is Guyana bauxite or equivalent bauxite with 70–90% gibbsite content.

3. A method according to claim 1, wherein the pH of the naturally occurring bauxite ranges from about 4.5 to 8 when measured at 20% by weight mixture of bauxite in water at 20 to 25° C.

4. A bauxite prepared according to claim 1.

5. A polymeric formulation useful as a carpet backing, comprising:

a polymer selected from the group consisting of polyester, styrene-butadiene latices, natural rubber acrylics, epoxies, polyurethanes, ethylene and propylene copolymers, polyvinyl chlorides, polyolefins, and polystyrene;

an optional wetting agent(s);

dispersant(s);

a non-lauryl sulfate and/or non-sulfosuccinate froth aid(s) and or anionic surfactant(s);

an optional thickener(s);

water; and a flame retardant filler, said flame retardant filler comprising a bauxite which has been ground sufficiently to provide a substantially uniform distribution of particles wherein said bauxite comprises predominantly particles of less than about 250 micrometers and contains from 20% by weight up to about 55% by weight of particles of less than 3 micrometers based on the total weight of the bauxite.

6. A polymeric formulation according to claim 5, wherein the polymer is a modified styrene butadiene which is compatible with said bauxite, the wetting agent(s) is an inorganic compound which aids in wetting out the bauxite in the latex; the dispersant system contains a chelating agent and/or a polyacrylate dispersant; and wherein said froth aid is an anionic surfactant which does not contain lauryl sulfate or sulfosuccinimate compounds.

7. A polymeric formulation according to claim 5, which contains about 0.01 to 2 wt. % dispersant, 0 to 2 wt. % wetting agent, about 0.01 to 2 wt. % froth aid or surfactant, about 0.01 to 5 wt. % thickener, about 15–35 wt. % latex, and about 30–70 wt. % filler.

8. A formulation according to claim 7, wherein the filler comprises bauxite alone or in combination with other fillers selected from the groups consisting of whiting (CaCO3) and ATH (alumina trihydrate).

9. A carpet backing comprising a polymer formulation of claim 5.

10. A method according to claim 1, wherein the bauxite contains fromn 20% to 45% by weight of particles of less than 3 micrometers based on the total weight of the bauxite.

11. A method according to claim 1, wherein said froth aid is an anionic surfactant.

* * * * *